United States Patent [19]

Teraoka

[11] Patent Number: 5,209,707
[45] Date of Patent: May 11, 1993

[54] PLANETARY DIFFERENTIAL ASSEMBLY
[75] Inventor: Masao Teraoka, Tochigi, Japan
[73] Assignee: Tochigifujisangyo Kabushiki Kaisha, Tochigi, Japan
[21] Appl. No.: 731,566
[22] Filed: Jul. 17, 1991
[30] Foreign Application Priority Data Jul. 18, 1990 [JP] Japan .................. 2-188136

[51] Int. Cl.⁵ ............................................ F16H 1/44
[52] U.S. Cl. ..................... 475/249; 475/224; 475/159
[58] Field of Search ......... 475/224, 249, 252, 248, 475/159, 160

[56] References Cited

U.S. PATENT DOCUMENTS

| | | | |
|---|---|---|---|
| 1,474,399 | 11/1923 | Bishop | 475/249 X |
| 2,178,613 | 11/1939 | Seeck | 475/226 |
| 2,550,750 | 5/1951 | Abelt | 475/249 |
| 2,651,215 | 9/1953 | Schoenrock | 475/249 |
| 3,343,429 | 9/1967 | Frost | 475/249 X |
| 4,041,804 | 8/1977 | Clark | 475/252 X |
| 4,084,654 | 4/1978 | Dudek | 180/233 |

FOREIGN PATENT DOCUMENTS

| | | |
|---|---|---|
| 451353 | 7/1943 | Belgium . |
| 523424 | 4/1956 | Canada .................. 475/249 |
| 3713119 | 11/1987 | Fed. Rep. of Germany . |
| 2619767 | 3/1989 | France . |
| 61-96238 | 5/1986 | Japan . |
| 1-166157 | 11/1989 | Japan . |
| 471986 | 4/1989 | Switzerland . |
| 1223435 | 2/1971 | United Kingdom .......... 475/249 |

Primary Examiner—Leslie A. Braun
Assistant Examiner—William C. Trousdell
Attorney, Agent, or Firm—Graham & James

[57] ABSTRACT

A planetary differential assembly is disclosed. The planetary differential assembly can spit driving torque generated by an engine of a vehicle (which uses the assembly) into two parts at an appropriate ratio to realize an optimum driving condition of the vehicle in traveling even when one of driving wheels of the vehicle loses traction on a bad-condition road. The above appropriate splitting of the driving torque is accomplished by applying a braking torque to each of component gears of a planetary gear set of the assembly. Such braking torque is produced: by reducing at least one of backlashes between these component gears to a possible minimum amount; and/or by roughing an outer peripheral surface of each of pins on which the components gears are rotatably supported, respectively; and/or by roughing an inner peripheral surface of each of central through-holes of the component gears, through which surface each of the gears is brought into a slidable contact with each of the pins.

4 Claims, 7 Drawing Sheets

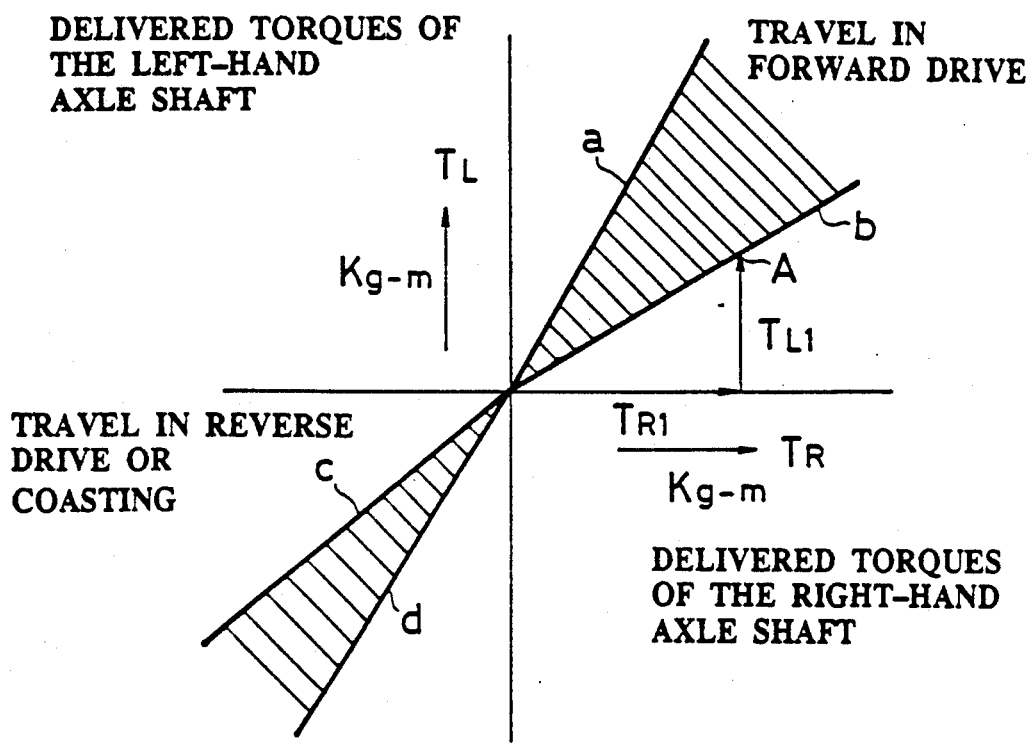
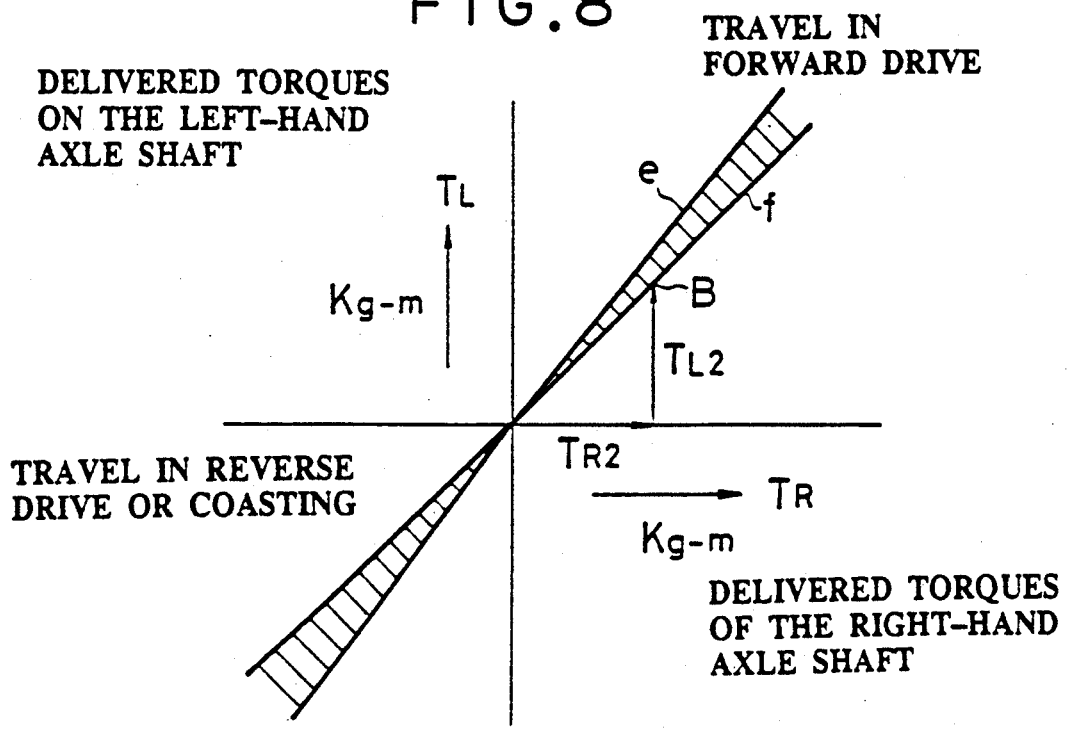

PLANETARY DIFFERENTIAL ASSEMBLY

BACKGROUND OF THE INVENTION

1. Field of the Invention

The present invention relates to a planetary differential assembly used in a power train of a vehicle.

2. Description of the Prior Art

Heretofore, it is well known to provide a conventional differential assembly using a planetary gear system, which assembly has a construction in which, for example: an internal gear is fixedly mounted on both of a driven gear and a differential case; a sun gear is coaxially arranged with the internal gear while rotatably arranged with respect to the differential case; a first planet gear is meshed with the internal gear; a second planet gear is meshed with the first planet gear while meshed with the sun gear; a planet-gear carrier for rotatably carrying the first and the second planet gear is rotatably arranged with respect to the differential case; the sun gear is connected with one of axle drive shafts, for example such as a left-hand axle drive shaft; and the planet-gear carrier is connected with the other of the axle drive shafts, i.e., a right-hand axle drive shaft.

In the conventional differential assembly having the above construction, when torque is transmitted to the differential case through the driven gear, the internal gear (which is integrally formed with the differential case) is rotatably driven so that the torque is further transmitted to both the sun gear and the planet-gear carrier through the first and the second planet gear, whereby the left-hand axle drive shaft (which is connected with the sun gear) is rotatably driven together with the right-hand axle drive shaft which is connected with the planet-gear carrier.

However, in some cases, for example, in case that the left-hand driving wheel of the vehicle loses traction due to a bad ground condition in traveling, then the other or right-hand driving wheel of the vehicle cannot deliver torque. In order to prevent this undesirable phenomenon from occurring in traveling, in other conventional differential assemblies (which is used in the vehicle) such as those disclosed in documents or Japanese Patent Laid-Open No. 61-96238 (called in Japanese language, Tokkaisho 61-96238) and Japanese Utility Model Laid-Open No. Hei 1-166157 (called in Japanese language, Jikkaihei 1-166157), the internal gear is limited in rotation relative to the planet-gear carrier or relative to the sun gear, so that relative rotation between: the left-hand driving wheel connected with the sun gear; and the right-hand driving wheel connected with the planet-gear carrier is limited to enable the driving wheel (which still keeps traction) to deliver torque.

However, as is clear from drawings attached to each of the above documents, in order to limit the relative rotation between the internal gear and the planet-gear carrier or that between the internal gear and the sun gear, it is necessary for each of the conventional differential assemblies to provide a multiple-disk clutch and like mechanisms therein. However, such multiple-disk clutch and like mechanisms make each of the conventional differential assemblies complex in construction and require much space, which necessarily enlarges each of the conventional differential assemblies in size. In addition, each of the conventional differential assemblies suffers from noise in operation unless it uses special lubricating oils. These are problems inherent in the conventional differential assemblies used in the vehicles.

SUMMARY OF THE INVENTION

It is an object of the present invention to resolve the above problems inherent in the conventional differential assemblies used in the vehicles by providing a planetary differential assembly which: does not require any clutch and like mechanisms, and, therefore is simple in construction; and, in addition, is capable of limiting relative rotation between a left-hand and a right-hand driving wheel of a vehicle using the planetary differential assembly of the present invention.

According to a first aspect of the present invention, the above object of the present invention is accomplished by providing:

In a planetary differential assembly comprising:

an internal gear fixedly mounted on a driven gear and a differential case;

a sun gear which is coaxially arranged with the internal gear while rotatably arranged with respect to the differential case, the sun gear being connected with one of drive shafts;

a first planet gear meshed with the internal gear;

a second planet gear meshed with both of the first planet gear and the sun gear;

a planet-gear carrier for rotatably carrying the first and the second planet gear, which carrier is rotatably arranged with respect to the differential case while connected with the other one of the drive shafts;

the improvement wherein:

a differential limiting means is provided in a rotational movement area of each of: the first and/or the second planet gear; and the planet-gear carrier.

Further, according to a second aspect of the present invention, the object of the present invention is accomplished by providing:

The planetary differential assembly as set forth in the first aspect of the present invention, wherein the differential limiting means is constructed of:

a circular bore formed in each of the first and the second planet gear; and a first and a second pin which are fixedly mounted on the planet-gear carrier while inserted respectively in the circular bore of the first planet gear and that of the second planet gear, each of the first and the second pin being provided with an oil groove in its outer peripheral surface.

In addition, according to a third aspect of the present invention, the object of the present invention is accomplished by providing:

The planetary differential assembly as set forth in the first aspect of the present invention, wherein the differential limiting means is constructed of:

a solid large-diameter pin portion provided in each of opposite sides of each of the first and the second planet gear; and a plurality of large-diameter circular bores formed in the planet-gear carrier, each of which large-diameter bores receives each of the large-diameter pin portions of the first and the second planet gear therein.

Still further, according to a fourth aspect of the present invention, the object of the present invention is accomplished by providing:

The planetary differential assembly as set forth in the first aspect of the present invention, wherein the differential limiting means is constructed of:

each of the first and the second planet gear each of which is provided with a solid large-diameter pin portion in one of its opposite sides while provided with a solid small-diameter pin portion in the other of the opposite sides thereof, the first planet gear being reversely provided with the solid large-diameter and the solid small-diameter pin as to the second planet gear in which the solid large-diameter and the solid small-diameter pin extend in directions counter to those of the solid large-diameter and the solid small-diameter pin of the first planet gear; and a plurality of large-diameter and small-diameter bores both of which are formed in the planet-gear carrier, in each of which large-diameter bores the solid large-diameter pin portion of each of the first and the second planet gear is received, and in each of which small-diameter bores the solid small-diameter pin portion of each of the first and the second planet gear is received.

Further, according to a fifth aspect of the present invention, the object of the present invention is accomplished by providing:

The planetary differential assembly as set forth in any one of the first to fourth aspects of the present invention, wherein:

the rotational movement area (of each of: the first and/or the second planet gear; and the planet-gear carrier) has a roughed rotary surface.

Still further, according to a sixth aspect of the present invention, the object of the present invention is accomplished by providing:

In the planetary differential assembly comprising:

an internal gear fixedly mounted on a driven gear and a differential case;

a sun gear which is coaxially arranged with the internal gear while rotatably arranged with respect to the differential case, the sun gear being connected with one of drive shafts;

a first planet gear meshed with the internal gear;

a second planet gear meshed with both of the first planet gear and the sun gear;

a planet-gear carrier for rotatably carrying the first and the second planet gear, which carrier is rotatably arranged with respect to the differential case while connected with the other one of the drive shafts; the improvement wherein:

said gears are formed and arranged so that at least one of backlashes required between: the internal gear and the first planet gear; the first planet gear and the second planet gear; and the second planet gear and the sun gear, is considerably reduced to a possible minimum amount.

Further, according to a seventh aspect of the present invention, the object of the present invention is accomplished by providing:

In a planetary differential assembly comprising:

an internal gear fixedly mounted on a driven gear and a differential case;

a sun gear which is coaxially arranged with the internal gear while rotatably arranged with respect to the differential case, the sun gear being connected with one of drive shafts;

a first planet gear meshed with the internal gear;

a second planet gear meshed with both of the first planet gear and the sun gear;

a planet-gear carrier for rotatably carrying the first and the second planet gear, which carrier is rotatably arranged with respect to the differential case while connected with the other one of the drive shafts; the improvement wherein:

the second planet gear is provided in an upstream side of the first planet gear with respect to a forward rotational direction (P) of the internal gear.

In operation of the planetary differential assembly of the present invention, torque generated in an engine of a vehicle is transmitted from the engine to a power train containing several mechanisms such as clutch, transmission, propeller shaft, differential assembly and opposite wheel axles. When the torque is transmitted to a driven gear or ring gear of the differential assembly, a differential case (which is integrally formed with the ring gear) and the internal gear are rotatably driven. Consequently, in traveling on a good condition ground, the planetary differential assembly containing the differential case, internal gear, first and second planet gear, sun gear, planet-gear carrier and the like is rotatably driven as a whole so as to deliver the substantially same amount of torque to each of opposite wheel axles of the vehicle.

If the planetary differential assembly is not provided with the differential limiting means at all and one of the driving wheels of the vehicle slips on a bad condition ground to lose its traction, the other of the driving wheels substantially cannot deliver any torque.

Consequently, in order to avoid the above trouble, each of the planetary differential assemblies according to the first, second, third, fourth and the fifth of the present invention is provided with a differential limiting means in a rotational movement area of each of the first and/or the second planet gear and of the planet-gear carrier, so that an appropriate amount of frictional torque is produced in such rotational movement area to enable one of the driving wheels of the vehicle to deliver torque even when the other of the driving wheel slips on the ground.

In addition, in the planetary differential assembly according to the sixth aspect of the present invention, since the internal gear, the first and the second planet gear, the sun gear and the planet gear carrier are formed and arranged so that at least one of backlashes between the internal gear and the first planet gear; and between the second planet gear and the sun gear is reduced to a possible minimum amount, an appropriate amount of braking torque is produced in the planetary gear set of the planetary differential assembly when relative rotation is produced between these components gears of the planetary gear set, so that one of the driving wheels of the vehicle can deliver torque even when the other of the driving wheels slips on the ground.

Further, in the planetary differential assembly according to the seventh aspect of the present invention, since the second planet gear is provided in an upstream side of the first planet gear with respect to a forward rotational direction (P) of the internal gear, when relative rotation is produced between the right-hand and the left-hand driving wheels or drive axle shafts, each of the planet gears is subjected to an appropriate amount of braking torque as it rotates on its axis, which makes it possible that one of the driving wheels of the vehicle delivers torque even when the other of the driving wheels slips on the ground, the driving wheels being connected with the drive axle shafts of the vehicle.

Further, in the planetary differential assembly of the present invention, when the internal gear rotates in a reverse rotational direction (Q) or when the vehicle is coasted on the ground, each of the planet gears is subjected to an appropriate amount of braking torque which is smaller than that produced in the forward rotational direction (P) of the internal gear, which makes it possible that one of the driving wheels of the vehicle delivers torque even when the other of the driving wheels slips on the ground.

BRIEF DESCRIPTION OF THE DRAWINGS

FIG. 7 is a diagram illustrating torque characteristics of the planetary differential assembly of the present invention; and FIG. 8 is a diagram illustrating torque characteristics of the conventional differential assembly.

DESCRIPTION OF THE PREFERRED EMBODIMENTS

Hereinbelow, a planetary differential assembly of the present invention will be described in detail with reference to the accompanying drawings, which assembly is used as a final reduction-gear unit of a vehicle.

Figure 1:
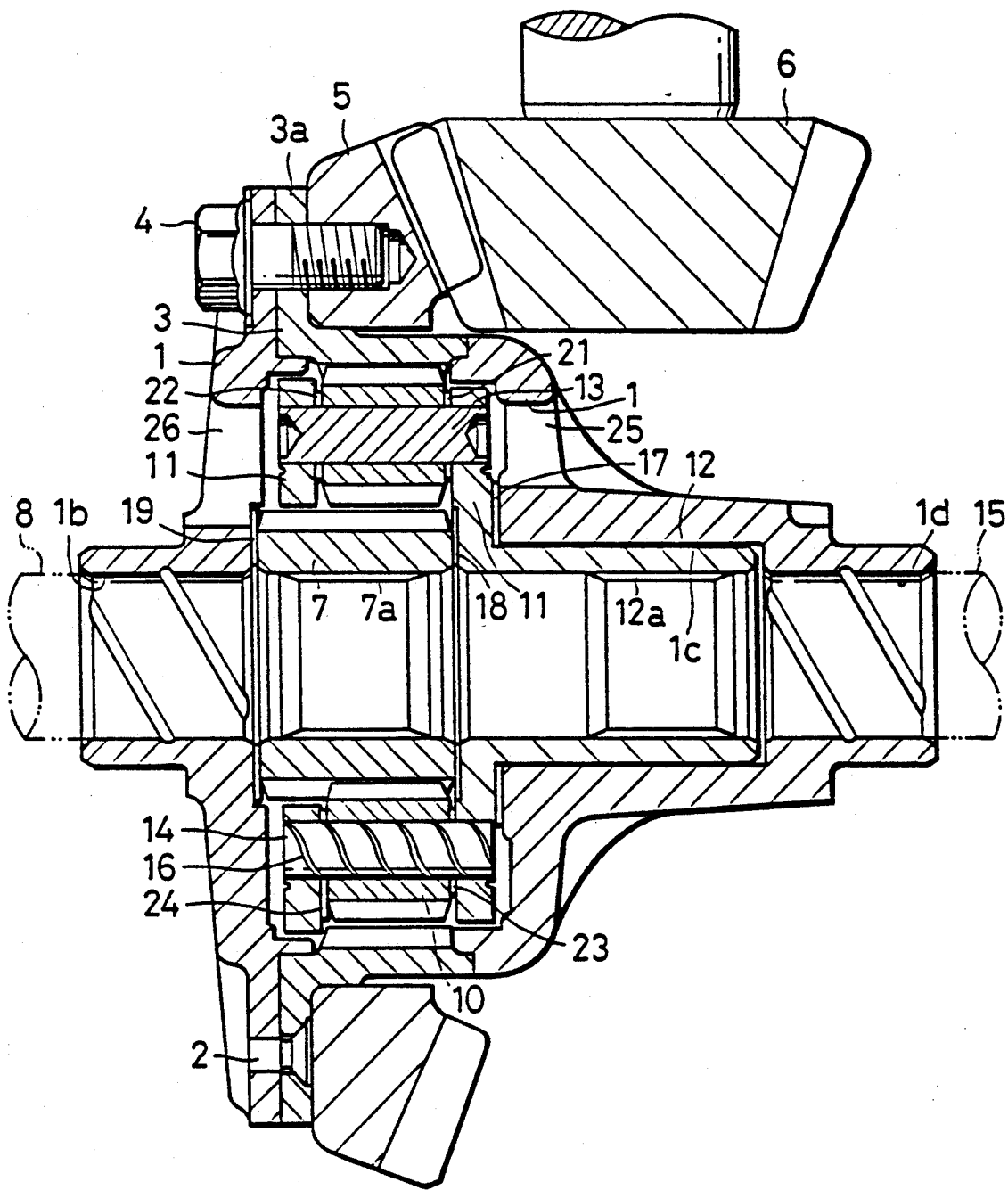
FIG. 1 is a longitudinal sectional view of a first embodiment of the planetary differential assembly according to the first, second and the fifth aspects of the present invention.
Figure 2:
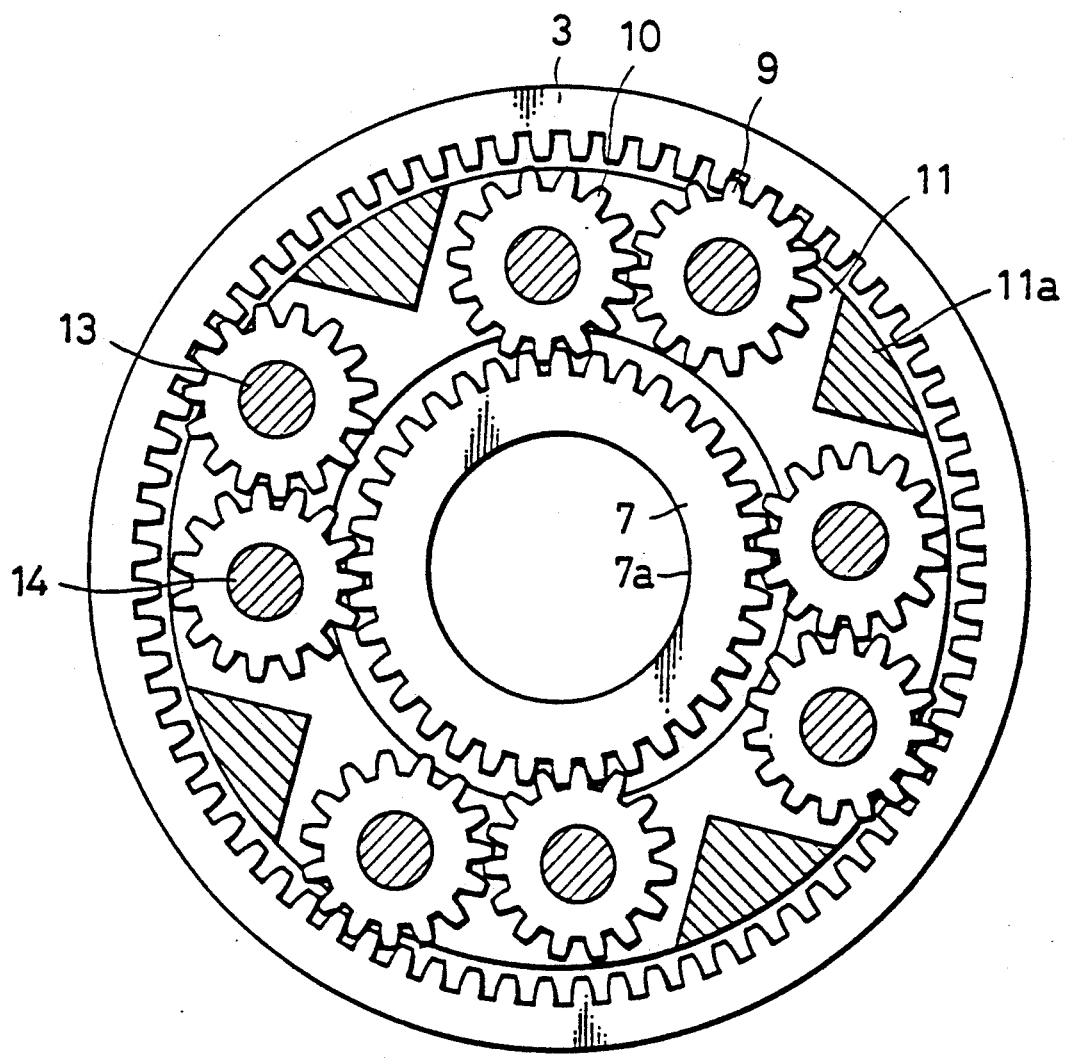
FIG. 2 is a cross-sectional view of a planetary gear set of the first embodiment of the present invention shown in FIG. 1, illustrating each of component gears of the planetary gear set.

FIG. 1 is a longitudinal sectional view of a first embodiment of the planetary differential assembly according to a first, second and a fifth aspects of the present invention. On the other hand, FIG. 2 is a cross-sectional view of a planetary gear set used in the planetary differential assembly of the present invention shown in FIG. 1, illustrating the arrangement of component gears of the planetary gear set.

As shown in FIG. 1, a flange portion 3a of an internal gear 3 is fixedly mounted on a differential case 1 through a plurality of screws 2. A ring gear 5, which is a driven gear, is fixedly mounted on the flange portion 3a of the internal gear 3 through a plurality of bolts 4.

The ring gear 5 is meshed with a drive pinion 6 which is rotatably driven by an engine of the vehicle through a suitable power train containing a transmission, a propeller shaft and like mechanisms.

In the differential case 1, there is rotatably provided a sun gear 7 having a splined axial center hole 7a. On the other hand, splines are formed in an outer peripheral surface of an inner end portion of a left-hand axle shaft 8. This shaft 8 constitutes one of drive shafts of the vehicle, and is splined to the sun gear 7 so that the two must turn together in operation. Another portion of the left-hand axle shaft 8, which portion is adjacent to the inner end portion of the shaft 8, is rotatably supported on a guide surface 1b of the differential case 1.

As is clear from FIG. 2, in the planetary differential assembly of the present invention, there are rotatably provided a plurality (in the first embodiment of the present invention shown in FIGS. 1 and 2, four) of first planet gears 9 which are meshed with an internal gear 3. Each of the first planet gears 9 is meshed with each of a plurality (in the first embodiment of the present invention shown in FIGS. 1 and 2, four) of second planet gears 10 each of which is in turn meshed with a sun gear 7.

The first and the second planet gears 9, 10 are rotatably supported on a planet-gear carrier 11 which is provided with a cylindrical portion 12 which extends rightwardly as viewed in FIG. 1. An outer peripheral surface of the cylindrical portion 12 of the planet-gear carrier is brought into a slidable contact with a guide surface 1c of the differential case 1. Incidentally, in FIG. 2, the reference numeral 11a denotes each of a plurality of bridge portions of the planet-gear carrier 11, through which bridge portions 11a a right and a left half of the planet-gear carrier 11 are integrally connected with each other.

Further, in the first embodiment of the present invention shown in FIGS. 1 and 2, each of a plurality of first pins 13 and each of plurality of second pins 14 are fixedly mounted on the planet-gear carrier 11 between the right and the left half of the carrier 11. Each of the first pins 13 is inserted into a circular through-hole of each of the first planet gears 9 to rotatably support the gear 9. On the other hand, each of the second pins 14 is inserted into a circular through-hole of each of the second planet gears 10 to rotatably support the gears 10, whereby the first and the second planet gears 9, 10 are rotatably supported by the planet-gear carrier 11.

In the planetary differential assembly of the present invention, in order to produce a frictional torque in the assembly, a clearance between each of the pins 13, 14 and each of the circular through-holes of the planet gears 9, 10 is reduced to a smaller amount than that in the conventional differential assembly. The components such as the pins 13, 14 and the planet gears 9, 10 used in a rotational movement area of the planetary differential assembly of the present invention is preferably made of materials excellent in wear resistance, for example such as surface-hardened steels and like materials.

In addition, in the first embodiment of the present invention shown in FIGS. 1 and 2, as is clear from FIG. 1, an spiral-shaped oil groove 16 is formed in an outer peripheral surface of each of the pins 13, 14 to control the thickness of oil films formed in the rotational movement area of the planetary differential assembly of the present invention, so that an amount of the frictional torque produced in the assembly is controlled.

As is clear from FIG. 1, splines 12a are formed in an inner peripheral surface of the cylindrical portion 12 of the planet-gear carrier 11. On the other hand, splines are also formed in an outer peripheral surface of a right-hand axle shaft 15 which is the other of the drive shafts of the vehicle. In assembling operation, consequently, the cylindrical portion 12 of the planet-gear carrier 11 is splined to the right-hand axle shaft 15 so that the two must turn together. Another portion of the right-hand axle shaft 15, which portion is adjacent to the above splined portion, is rotatably supported on a guide surface 1d of the differential case 1.

Incidentally, in FIG. 1: each of the reference numerals 17, 18, 19, 21, 22, 23 and 24 denotes a washer; and each of the reference numerals 25, 26 denotes an inlet/outlet port for lubricating oils.

Incidentally, it is also possible to increase the frictional torque in the planetary differential assembly of the present invention by roughing the rotational movement area (of the assembly) containing an outer peripheral surface of each of the pins 13, 14 and an inner peripheral surface of each of the circular through-holes of the planet gears 9, 10.

Now, a second embodiment of the planetary differential assembly according to the first and a third aspect of the present invention will be described with reference to FIG. 3. Since this second embodiment of the planetary differential assembly of the present invention differs from the first embodiment of the present invention shown in FIG. 1 only in rotatably supporting portions of the planet gears, like reference numerals are applied to similar parts of these assemblies throughout FIGS. 1 to 3 so as to avoid redundancy in description. Therefore, only parts of the second embodiment, which differ from those of the first embodiment, will be described hereinbelow.

Figure 3:
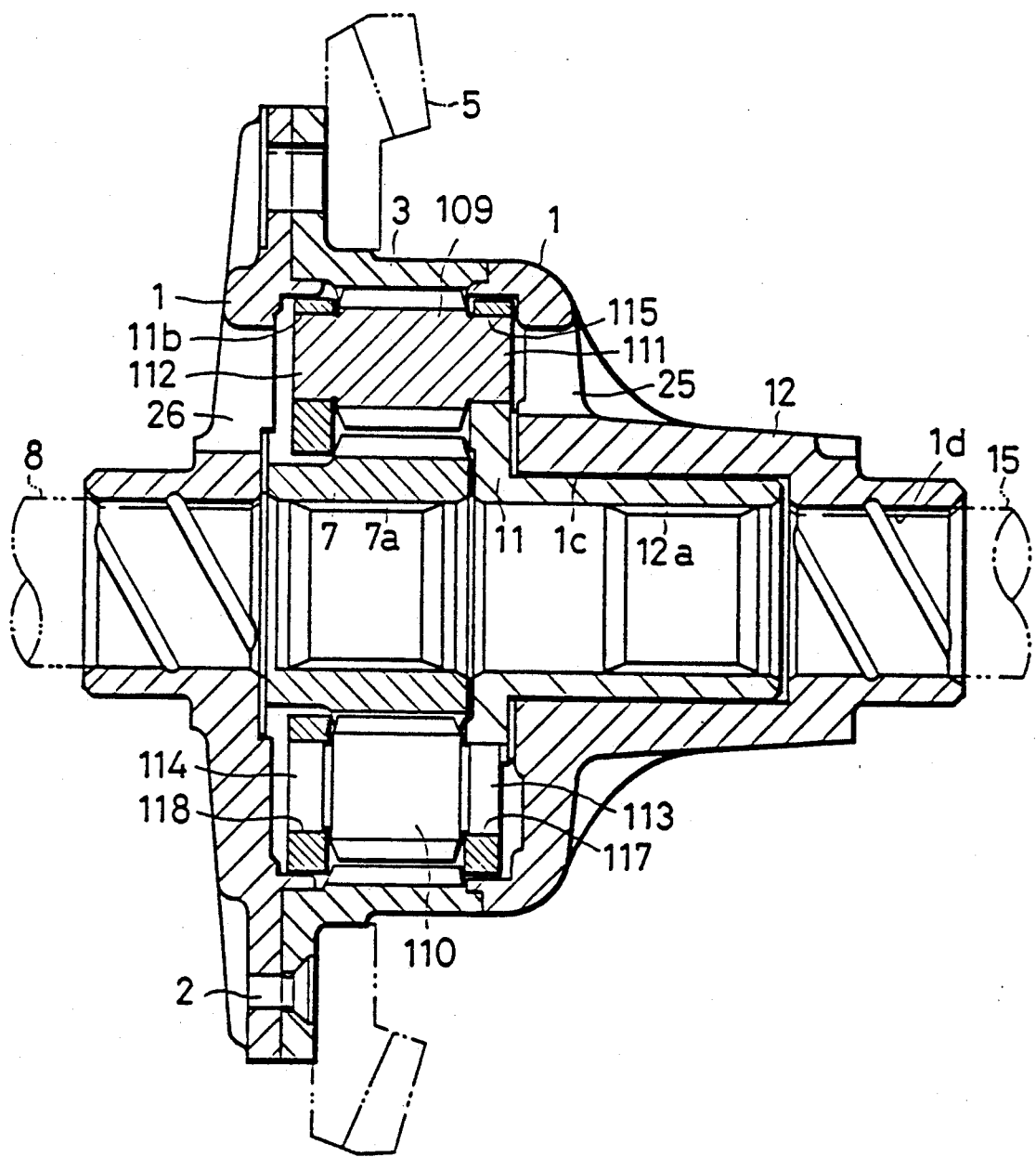
FIG. 3 is a longitudinal sectional view of a second embodiment of the planetary differential assembly according to the first, third and the fifth aspects of the present invention.

In the second embodiment of the planetary differential assembly of the present invention shown in FIG. 3, each of the planet gears 109, 110 constitutes a solid member which has its large-diameter pin portions 111, 112 (or 113, 114) integrally formed with its opposite sides. Consequently, the planet-gear carrier 11 of the second embodiment of the present invention is provided with large-diameter circular holes 115, 116 (or 117, 118) for receiving therein the large-diameter pin portions 111, 112 (or 113, 114) of each of the planet gears 109, 110, respectively. As described above, by increasing in diameter the rotational movement area of the planetary differential assembly of the second embodiment, it is possible to increase the frictional torque in the area of the assembly even if there is no difference in frictional coefficient between the first embodiment shown in FIG. 1 and the second embodiment shown in FIG. 3.

In the second embodiment of the planetary differential assembly of the present invention shown in FIG. 3, it is also preferable to use the materials excellent in wear resistance in the rotational movement area of the assembly, the materials being, for example such as surface-hardened steels and like materials.

Figure 4:
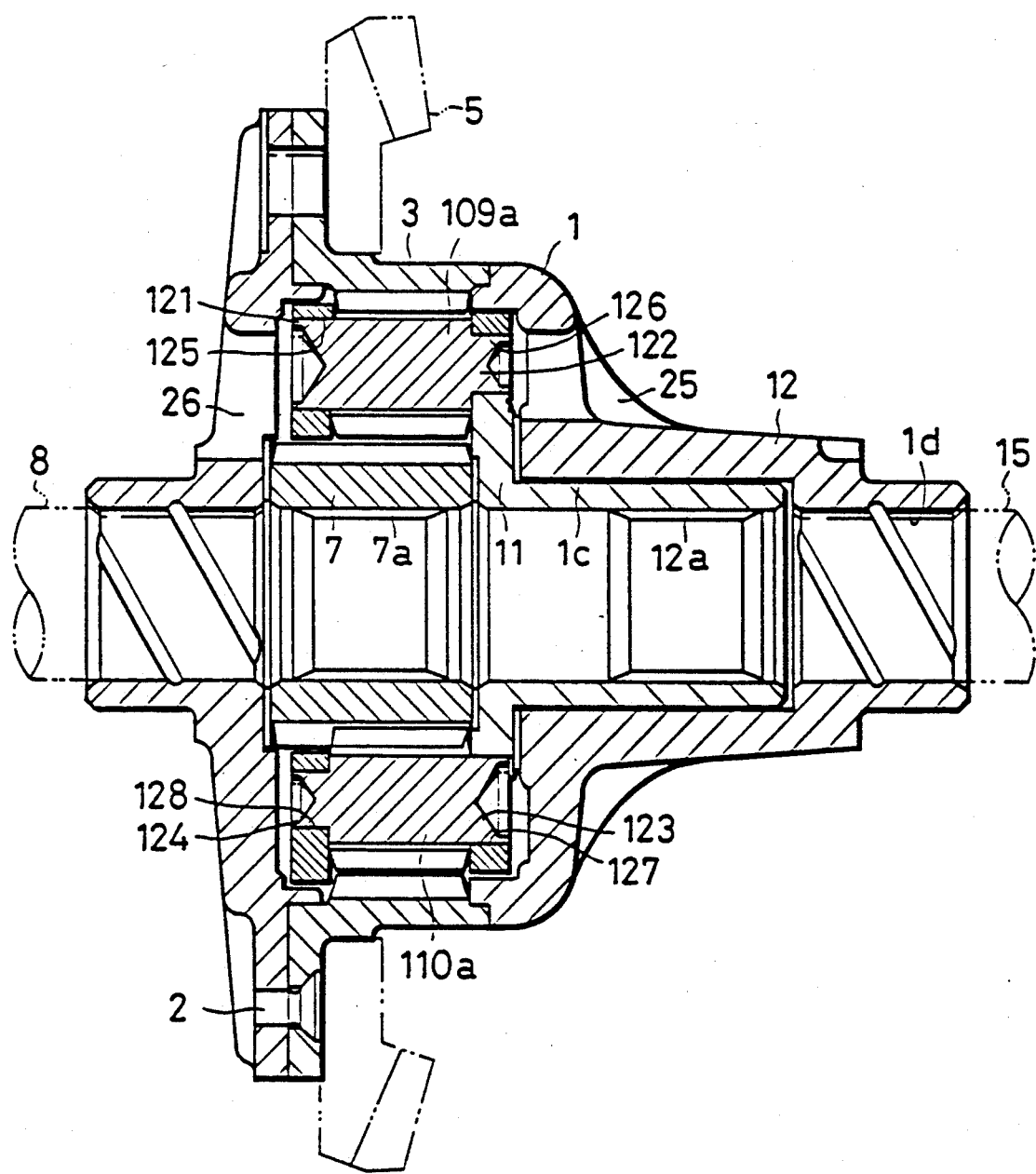
FIG. 4 is a longitudinal sectional view of a third embodiment of the planetary differential assembly according to the first, fourth and the fifth aspects of the present invention.

FIG. 4 shows a third embodiment of the present invention, which will be now described hereinbelow. Since the third embodiment of the present invention differs from the second embodiment of the present invention shown in FIG. 3 only in rotatably supporting portions of the planet gears, like reference numerals are applied to similar parts of these assemblies throughout FIGS. 3 and 4 so as to avoid redundancy in description. Therefore, only parts of the third embodiment shown in FIG. 4, which parts differ from those of the second embodiment, will be described hereinbelow with reference to FIG. 4.

In the third embodiment of the present invention, as is clear from FIG. 4, each of the first and the second planet gear 109a, 110a constitutes a solid member. More particularly, the first planet gear 109a has its left-hand large-diameter pin portion 121 integrally formed with its left-hand side, and has its right-hand small-diameter pin portion 122 integrally formed with its right-hand side. In like manner, the second planet gear 110a has its right-hand large-diameter pin portion 123 integrally formed with its right-hand side, and has its left-hand small-diameter pin portion 124 integrally formed with its left-hand side. Consequently, the planet-gear carrier 11 of the third embodiment of the present invention is provided with large-diameter circular holes 125, 127 and small-diameter circular holes 126, 128 for receiving therein the large-diameter pin portions 121, 123 and the small-diameter pin portions 124, 126 of each of the planet gears 109a, 110a, respectively.

The above construction of the third embodiment of the present invention shown in FIG. 4 is advantageous in preventing the large-diameter pin portions of the first and the second planet gear (which are adjacent to each other) from interfering with each other, and, therefore advantageous in achieving maximum compactness of the planetary differential assembly of the present invention.

Incidentally, it is possible to increase the frictional torque in each of the second embodiment (shown in FIG. 3) and the third embodiment (shown in FIG. 4) of the present invention by roughing the outer peripheral surfaces of the pin portions of the planet gears and the inner peripheral surfaces of the circular holes for receiving these pin portions of the planet gears therein, the circular holes being formed in the planet-gear carrier 11.

Now, a fourth embodiment of the planetary differential assembly of the present invention will be described with reference to FIG. 2. In the fourth embodiment of the assembly, the gears are formed and arranged so that each of backlashes between: the internal gear 3 an the first planet gear 9; the first planet gear 9 and the second planet gear 10; and between the second planet gear 10 and the sun gear 7, is reduced to a possible minimum amount.

In some cases, it is possible to reduce at least one of these backlashes to the possible minimum amount.

By reducing at least one of these backlashes to the possible minimum amount, it is possible to apply braking torque to relative rotations between the component gears of the assembly containing the internal gear 3, first planet gear 9, second planet gear 10 and the sun gear 7, so that a differential limiting operation is effected between the sun gear 7 and the planet-gear carrier 11.

Figure 5:
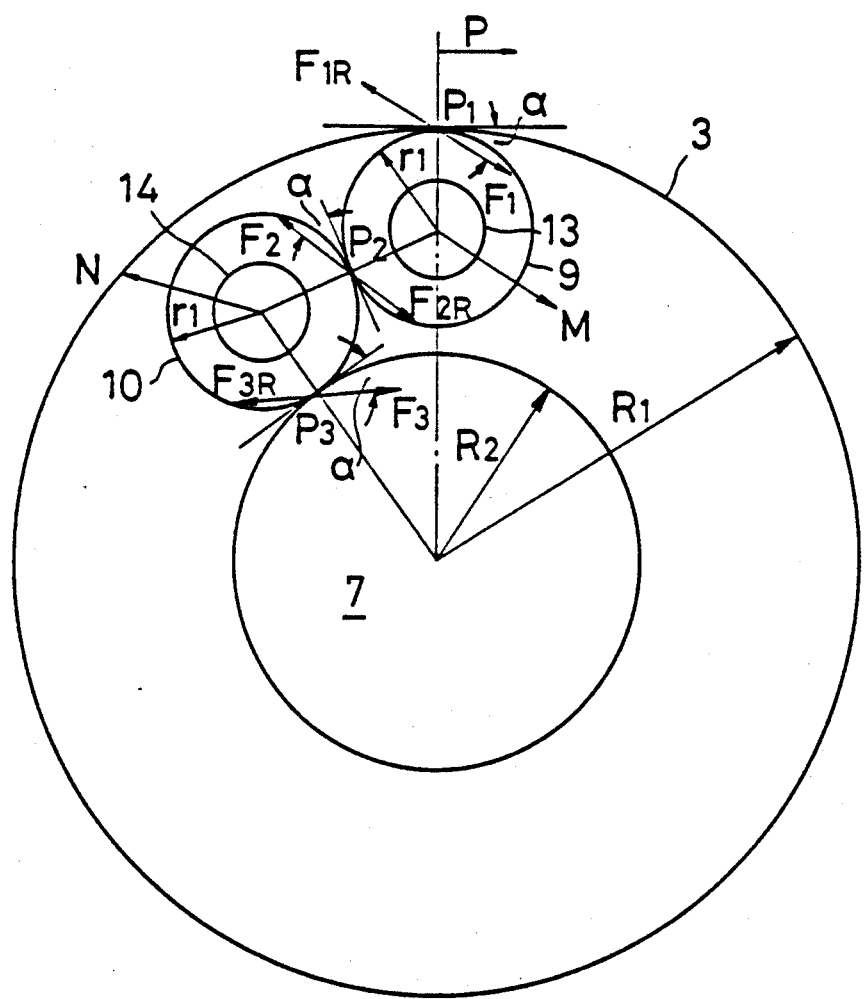
FIG. 5 is a skeletonized cross-sectional view of the planetary gear set of the planetary differential assembly according to the seventh aspect of the present invention, illustrating a condition in which the internal gear of the assembly rotates in a forward rotational direction (P)
Figure 6:
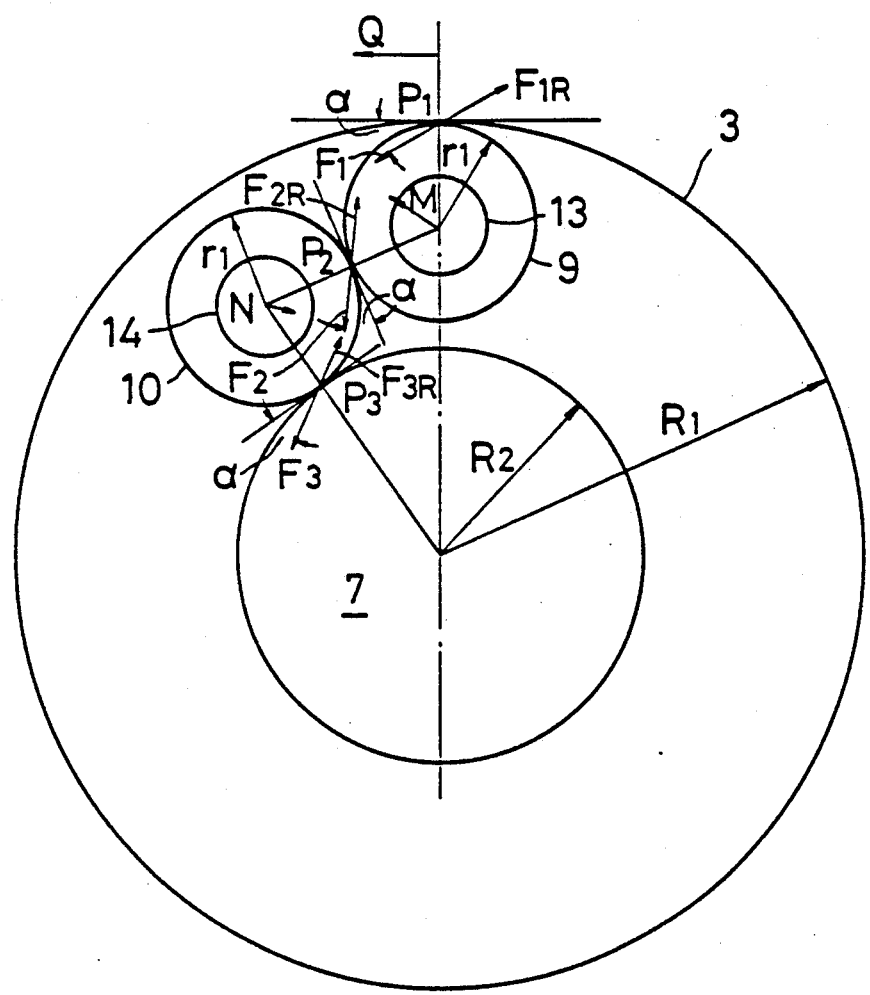
FIG. 6 is a skeletonized cross-sectional view of the planetary gear set of the planetary differential assembly according to the seventh aspect of the present invention, illustrating a condition in which the internal gear of the assembly rotates in a reverse rotational direction (Q)

FIGS. 5 and 6 show a fifth embodiment of the planetary differential assembly of the present invention, which will be described hereinbelow with reference to the drawings.

In a condition shown in FIG. 5, the internal gear 3 is rotatably driven in a forward rotational direction P, in which condition the vehicle travels forward. On the other hand, in a condition shown in FIG. 6, the internal gear 3 is rotatably driven in a reverse rotational direction Q, in which condition the vehicle travels in reverse drive or is coasted.

In FIGS. 5 and 6: the reference character $R_1$ denotes a radius of a pitch circle of the internal gear 3; $R_2$ a radius of a pitch circle of the sun gear 7; $r_1$ a radius of a pitch circle of each of the first planet gear 9 and the second planet gear 10; and $\alpha$ an operating pressure angle.

As shown in FIGS. 5 and 6, the second planet gear 10 is provided in an upstream side of the first planet gear 9 with respect to the forward rotational direction P (shown in FIG. 5) of the internal gear 3, the gear 3 being rotatably driven in the direction P when the vehicle travels forward.

As shown in FIG. 5, in case that the vehicle travels forward on a good-condition road, the internal gear 3 is rotatably driven in its forward rotational direction P, so that the planetary gear set (which contains: the planet gears 9, 10; pins 13, 14; and the sun gear 7) is rotatably driven as an integral entity since there is substantially no relative rotation between these components 9, 10, 13, 14 and 7 of the planetary gear set, whereby both of the right-hand axle shaft 15 (which is connected with the planet-gear carrier 11) and the left-hand axle shaft 8 (which is connected with the sun gear 7) of the vehicle are rotatably driven at the substantially same velocity of deliver the substantially same amount of torque.

In the above condition, in a direction of a line of action passing through each of pitch points $P_1$, $P_2$ and $P_3$, there appear: a component $F_1$ (of a force applied in the direction P) and its equal reactive force $F_{1R}$; a force $F_2$ and its equal reactive force $F_{2R}$; and a force $F_3$ and its equal reactive force $F_{3R}$; respectively. In operation, the first planet gear 9 is subjected to both of the force $F_1$ and the reactive force $F_{2R}$. The resultant or sum of these forces $F_1$, $F_{2R}$ is denoted by the reference character M in FIG. 5. Under the influence of the resultant M acting on the first planet gear 9, the gear 9 is strongly pressed against the first pin 13 in the direction of the resultant M so that there appears a very large frictional resistance between the pin 13 and the gear 9, which resistance appropriately limits the rotational movement of the gear 9 on its axis.

On the other hand, the second planet gear 10 is subjected to both of the force $F_2$ and the reactive force $F_{3R}$. The resultant or sum of these forces $F_2$, $F_{3R}$ is denoted by the reference character N in FIG. 5. Under the influence of the resultant N acting on the second planet gear 10, the gear 10 is strongly pressed against the second pin 14 in the direction of the resultant N so that there appears a very large frictional resistance between the pin 14 and the gear 10, which resistance appropriately limits the rotational movement of the gear 10 on its axis.

As described above, since both of the first planet gear 9 and the second planet gear 10 are appropriately limited in rotation on their axes, a relative rotation between the sun gear 7 and the planet-gear carrier 11 is also appropriately limited in operation.

As shown in FIG. 6, in case that the vehicle travels in reverse drive on a good-condition road or is coasted thereon, the internal gear 3 is rotatably driven in its reverse rotational direction Q, so that the planetary gear set (which contains: the planet gears 9, 10; pins 13, 14; and the sun gear 7) is rotatably driven as an integral entity since there is substantially no relative rotation between these components 9, 10, 13, 14 and 7 of the planetary gear set, whereby both of the right-hand axle shaft 15 (which is connected with the planet-gear carrier 11) and the left-hand axle shaft 8 (which is connected with the sun gear 7) of the vehicle are rotatably driven at the substantially same velocity to deliver the substantially same amount of torque.

In the above condition, in a direction of a line of action passing through each of pitch points $P_1$, $P_2$ and $P_3$, there appear: a component $F_1$ (of a force applied in the direction Q) and its equal reactive force $F_{1R}$; a force $F_2$ and its equal reactive force $F_{2R}$; and a force $F_3$ and its equal reactive force $F_{3R}$; respectively. In operation, the first planet gear 9 is subjected to both of the force $F_1$ and the reactive force $F_{2R}$. The resultant or sum of these forces $F_1$, $F_{2R}$ is denoted by the reference character M in FIG. 6. Under the influence of the resultant M acting on the first planet gear 9, the gear 9 is strongly pressed against the first pin 13 in the direction of the resultant M so that there appears a large frictional resistance (which is smaller in amount than that appearing in FIG. 5) between the pin 13 and the gear 9, which resistance appropriately limits the rotational movement of the gear 9 on its axis.

On the other hand, the second planet gear 10 is subjected to both of the force $F_2$ and the reactive force $F_{3R}$. The resultant or sum of these forces $F_2$, $F_{3R}$ is denoted by the reference character N in FIG. 6. Under the influence of the resultant N acting on the second planet gear 10, the gear 10 is strongly pressed against the second pin 14 in the direction of the resultant N so that there appears a large frictional resistance between the pin 14 and the gear 10, which resistance appropriately limits the rotational movement of the gear 10 on its axis.

As described above, since both of the first planet gear 9 and the second planet gear 10 are appropriately limited in rotation on their axes, a relative rotation between the sun gear 7 and the planet-gear carrier 11 is also appropriately limited in operation. More particularly, a relative rotation between the left-hand axle shaft 8 and the right-hand axle shaft 15 of the vehicle is appropriately limited when the vehicle travels in reverse drive or is coated on the good-condition road.

Incidentally, it is possible to intensify each of the resultants M, N by increasing the operating pressure angle α (alpha).

The planetary differential assembly of the present invention operates as follows:

Even when one of driving wheels of a vehicle (which uses the planetary differential assembly according to the first, second, third, fourth and the fifth aspects of the present invention), for example, the left-hand driving wheel of the vehicle slips on the ground to lose traction due to a bad ground condition, it is possible for the planetary differential assembly of the present invention to prevent the left-hand driving wheel from rotating at an excessive angular velocity and to keep an angular velocity of the other of the driving wheels (which is the right-hand driving wheel of the vehicle) constant, whereby the vehicle may keep on its traveling.

In the planetary differential assembly according to the sixth aspect of the present invention, since the gears are formed and arranged so that each of the backlashes between the component gears of the planetary gear set of the assembly is reduced to the possible minimum amount, the braking torques are produced in the planetary gear set when relative rotations are produced between these component gears. Consequently, in traveling of the vehicle using the assembly of the present invention, even when one of the driving wheels of the vehicle, for example, the left-hand driving wheel of the vehicle slips on the ground, it is possible for the assembly of the present invention to make the other of the driving wheels of the vehicle (which is the right-hand driving wheel in this example) deliver torque in an appropriate manner.

Further, as for the planetary differential assembly according to the seventh aspect of the present invention, since the second planet gear 10 is provided in the upstream side of the first planet gear 9 with respect to the forward rotational direction P of the internal gear 3, it is possible for the assembly to produce therein relatively large braking torques when the vehicle travels forward, and to produce in the assembly relatively small braking torques when the vehicle travels in reverse drive or is coasted in its forward traveling, whereby each of the opposite driving wheels of the vehicle may deliver torque in the above driving conditions.

FIG. 7 is a diagram illustrating torque characteristics of the planetary differential assembly of the present invention, data of which diagram is obtained through experimental operations of the assembly. In the diagram shown in FIG. 7: the horizontal axis of the diagram shows the delivered torques $T_R$ of the right-hand axle shaft 15 in Kg-m unit; the vertical axis of the diagram shows the delivered torques $T_L$ of the left-hand axle shaft 8 in Kg-m unit; a linear function "a" defines a limit of the delivered torques $T_L$ of the left-hand axle shaft 8 in a condition in which the right-hand driving wheel (which is connected with the right-hand axle shaft 15) begins to slip or begins to lose traction in traveling; and a linear function "b" defines a limit of the delivered torque of the right-hand axle shaft 15 in a condition in which the left-hand driving wheel (which is connected with the left-hand axle shaft 8) begins to slip or begins to lose traction in traveling.

In a normal traveling condition of the vehicle using the planetary differential assembly of the present invention, the vehicle is operated within a hatched area of the diagram shown in FIG. 7, which area is defined by the linear functions "a" and "b" of the diagram. In this case, for example, even when the left-hand driving wheel of the vehicle slips on the ground to have the delivered torque $T_L$ of the wheel reduced to an amount of $T_{L1}$ as shown at a point "A" in the diagram of FIG. 7, it is possible to keep the delivered torque $T_R$ of the right-hand axle shaft 15 at a relatively high level, which enables the right-hand axle shaft 15 to deliver an appropriate amount of driving torque $T_{R1}$.

In addition, for example, even when the right-hand driving wheel of the vehicle (which wheel is connected with the right-hand axle shaft 15) slips on the ground in traveling to have the delivered torque $T_R$ of the wheel reduced, it is possible for the left-hand axle shaft 8 to deliver a relatively large amount of the torque $T_L$ according to the limit defined by the linear function "a" of the diagram of FIG. 7, as is in the case of the limit defined by the linear function "b" of the same diagram, which permits the vehicle to keep on traveling.

Incidentally, in the third quadrant of the diagram or cartesian coordinate system shown in FIG. 7, linear functions "c", "d" defines limits of delivered torques $T_L$, $T_R$ of the driving wheels of the vehicle using the planetary differential assembly of the present invention when the vehicle travels in reverse drive or is coasted in traveling, which limits are determined through experimental operations of the vehicle and found to be poorer than those appearing in the first quadrant of the diagram of FIG. 7. Due to such characteristics of the planetary differential assembly of the present invention illustrated in the diagram of FIG. 7, it is possible for the vehicle using assembly of the present invention to be free from a tendency of under-steer when the vehicle turns a corner, and also free from interference with an anti-skid braking system (ABS) of the vehicle in traveling.

FIG. 8 is a diagram illustrating torque characteristics of a conventional differential assembly used in a vehicle, in relative-rotation portions of which assembly are provided a plurality of needle bearings for reducing frictional resistance appearing in these portions to a possible minimum amount, the diagram being obtained through experimental operations of the vehicle. In traveling, for example, when the left-hand driving wheel of the vehicle using the conventional differential assembly slips on the ground to have the delivered torque $T_L$ of the wheel reduced to an amount of $T_{L2}$ as shown at a point "B" in the diagram of FIG. 8, the delivered torque $T_R$ of the right-hand driving wheel of the vehicle is found to be considerably reduced to an amount of $T_{R2}$.

In the same way, when the right-hand driving wheel of the vehicle slips on the ground to have the delivered torque $T_R$ of the wheel reduced, as is clear from a linear function "e" of the diagram of FIG. 8, the delivered torque $T_L$ of the left-hand driving wheel of the vehicle is considerably reduced too.

As described above, the planetary differential assembly of the present invention is superior in torque characteristics to the conventional differential assembly.

What is claimed is:

1. A planetary differential assembly for use with a vehicle having a plurality of drive shafts comprising:
   an internal gear fixedly mounted on a driven gear and a differential case;
   a sun gear which is coaxially arranged with said internal gear while rotatably arranged with respect to said differential case, said sun gear being connected to one of said plurality of drive shafts;
   a first planet gear meshed with said internal gear;
   a second planet gear meshed with said first planet gear and with said sun gear; and
   a planet-gear carrier for rotatably carrying said first planet gear and said second planet gear, said planet-gear carrier being rotatably arranged with respect to said differential case while being connected to another of said plurality of drive shafts; and
   a differential limiting means including a circular bore formed in each of said first and said second planet gears and a first pin and a second pin fixedly mounted on said planet-gear carrier, said first and second pins being inserted respectively in said circular bore of said first planet gear and that of said second planet gear, and each of said first and said second pins being provided with an oil groove in its outer peripheral surface.

2. A planetary differential assembly for use with a vehicle having a plurality of drive shafts comprising:
   an internal gear fixedly mounted on a driven gear and a differential case;
   a sun gear which is coaxially arranged with said internal gear while rotatably arranged with respect to said differential case; said sun gear being connected to one of said plurality of drive shafts;
   a first planet gear meshed with said internal gear, said first planet gear having a first end facing a first direction and a second end facing a second direction, the first planet gear having a solid first diameter pin portion on the first end and a solid second diameter pin portion on the second end;
   a second planet gear meshed with said first planet gear and with said sun gear, said second planet gear having a first end facing the first direction and second end facing the second direction, the second gear having a solid first diameter pin portion on the second end and a solid second diameter pin portion on the first end; and
   a planet-gear carrier for rotatably carrying said first planet gear and said second planet gear, said planet-gear carrier being rotatably arranged with respect to said differential case while being connected to another of said plurality of drive shafts, said planet-gear carrier defining a plurality of first diameter bores for receiving the first diameter pin portions of the first and the second planet gears and a plurality of second diameter bores for receiving the second diameter pin portions of the first and second planet gears.

3. A planetary differential assembly for a vehicle with a plurality of drive shafts, comprising:

an internal gear fixedly mounted on a driven gear and a differential case;

a sun gear which is coaxially arranged with said internal gear while rotatably arranged with respect to said differential case, said sun gear being connected with one of said plurality of drive shafts;

a first planet gear meshed with said internal gear, said first planet gear having a circular bore open at a center thereof;

a second planet gear meshed with both of said first planet gears and with said sun gear, said second planet gear having a circular bore open at a center thereof;

a first pin and a second pin being inserted respectively in said circular bores of said first planet gear and said second planet gear, each of said first and second pins being provided with an oil groove in its outer peripheral surface; and a planet-gear carrier carrying said first pin and said second pin, rotatably arranged with respect to said differential case, connected with another one of said drive shafts.

4. A planetary differential assembly for a vehicle with a plurality of drive shafts, comprising:

an internal gear fixedly mounted on a driven gear and a differential case;

a sun gear which is coaxially arranged with said internal gear while rotatably arranged with respect to said differential case, said sun gear being connected with one of said plurality of drive shafts;

a first planet gear meshed with said internal gear, said first planet gear having a first end facing a first direction and a second end facing a second direction, the first planet gear having a solid first diameter pin portion on the first end and a solid second diameter pin portion on the second end;

a second planet gear meshed with both of said first planet gear and said sun gear, said second planet gear having a first end facing a first direction and a second end facing a second direction, the second planet gear having a solid first diameter pin portion on the second end and a solid second diameter pin portion on the first end; and a planet-gear carrier having a plurality of first diameter and second diameter bores in each of which said first diameter bores said solid first diameter pin portion of each of said first and second planet gear is received, and in each of which said second diameter bores said solid second diameter pin portion of each of said first and second planet gears is received, said planet gear carrier being rotatably arranged with respect to said differential case and connected with another of said drive shafts.

* * * * *